United States Patent
Lai

(10) Patent No.: US 8,155,623 B2
(45) Date of Patent: Apr. 10, 2012

(54) SYSTEM AND METHOD FOR OBTAINING INFORMATION FROM A WIRELESS MODEM

(75) Inventor: Duc Dinh Lai, Chantilly, VA (US)

(73) Assignee: Nextel Communications Inc., Reston, VA (US)

( * ) Notice: Subject to any disclaimer, the term of this patent is extended or adjusted under 35 U.S.C. 154(b) by 1412 days.

(21) Appl. No.: 11/191,921

(22) Filed: Jul. 29, 2005

(65) Prior Publication Data

US 2007/0026891 A1 Feb. 1, 2007

(51) Int. Cl.
*H04M 1/66* (2006.01)
*H04L 9/32* (2006.01)

(52) U.S. Cl. ........ 455/411; 370/338; 455/557; 713/161; 713/170

(58) Field of Classification Search .................. 713/156, 713/172, 185, 161, 168, 169, 170, 153, 206; 455/410–411, 557, 456.1; 370/338
See application file for complete search history.

(56) References Cited

U.S. PATENT DOCUMENTS

| 6,185,680 | B1 * | 2/2001 | Shimbo et al. | 713/160 |
|---|---|---|---|---|
| 6,640,241 | B1 * | 10/2003 | Ozzie et al. | 709/204 |
| 7,133,666 | B2 * | 11/2006 | Arai | 455/421 |
| 7,353,034 | B2 * | 4/2008 | Haney | 455/457 |
| 2002/0142797 | A1 * | 10/2002 | Tarighi et al. | 455/556 |
| 2002/0197979 | A1 * | 12/2002 | Vanderveen | 455/410 |
| 2004/0151192 | A1 * | 8/2004 | Trossen | 370/401 |
| 2005/0102529 | A1 * | 5/2005 | Buddhikot et al. | 713/200 |
| 2006/0280140 | A9 * | 12/2006 | Mahany et al. | 370/329 |
| 2007/0015518 | A1 * | 1/2007 | Winter et al. | 455/456.1 |

\* cited by examiner

*Primary Examiner* — George Eng
*Assistant Examiner* — Marcos Torres

(57) ABSTRACT

Systems and methods for obtaining information from a wireless modem are provided. An information requesting device can send an information request to the wireless modem. The wireless modem authenticates the information request, obtains the requested information and provides the obtained information to the information requesting device. The information can be a current location of the wireless modem, a received signal strength, whether the wireless modem is transmitting or receiving data, whether an external device is coupled to the wireless modem, and/or the like.

30 Claims, 3 Drawing Sheets

| Header Address | Authentication Token | Information Request |
|---|---|---|

FIGURE 3a

| Header Address | Authentication Token | Information Response |
|---|---|---|

FIGURE 3b

SYSTEM AND METHOD FOR OBTAINING INFORMATION FROM A WIRELESS MODEM

BACKGROUND OF THE INVENTION

Wireless communication devices, such as cellular telephones, currently provide a number of different capabilities. For example, in addition to voice processors for supporting voice communications, many wireless communication devices include modems for supporting data communications. Additionally, many wireless communication devices now include global positioning satellite (GPS) receivers, which are used for determining a current position of the device based on information received from satellites.

GPS receivers were added to wireless communication devices to support emergency 911 services. Specifically, when a user of a wireless communication device calls an emergency call center, the GPS receiver can provide the user's current location to the operator while the operator at the emergency call center is speaking with the user. Although the use of GPS receivers in the emergency 911 services context is particularly useful, it requires an established voice call for the GPS receiver to provide the current location.

SUMMARY OF THE INVENTION

Systems and methods for obtaining information from a wireless modem are provided. In accordance with exemplary embodiments of the present invention, a wireless modem receives an information request packet, which contains an information request and an authentication token. The wireless modem authenticates the information request packet using the authentication token. When the packet has been authenticated, the modem obtains the requested information and forms an information response packet. The information response packet is addressed to the information requestor and includes the obtained information and the authentication token.

Other objects, advantages and novel features of the present invention will become apparent from the following detailed description of the invention when considered in conjunction with the accompanying drawings.

BRIEF DESCRIPTION OF THE DRAWING FIGURES

FIG. 3a illustrates an exemplary information request packet; and

FIG. 3b illustrates an exemplary information response packet.

DETAILED DESCRIPTION OF THE PREFERRED EMBODIMENTS

Figure 1:
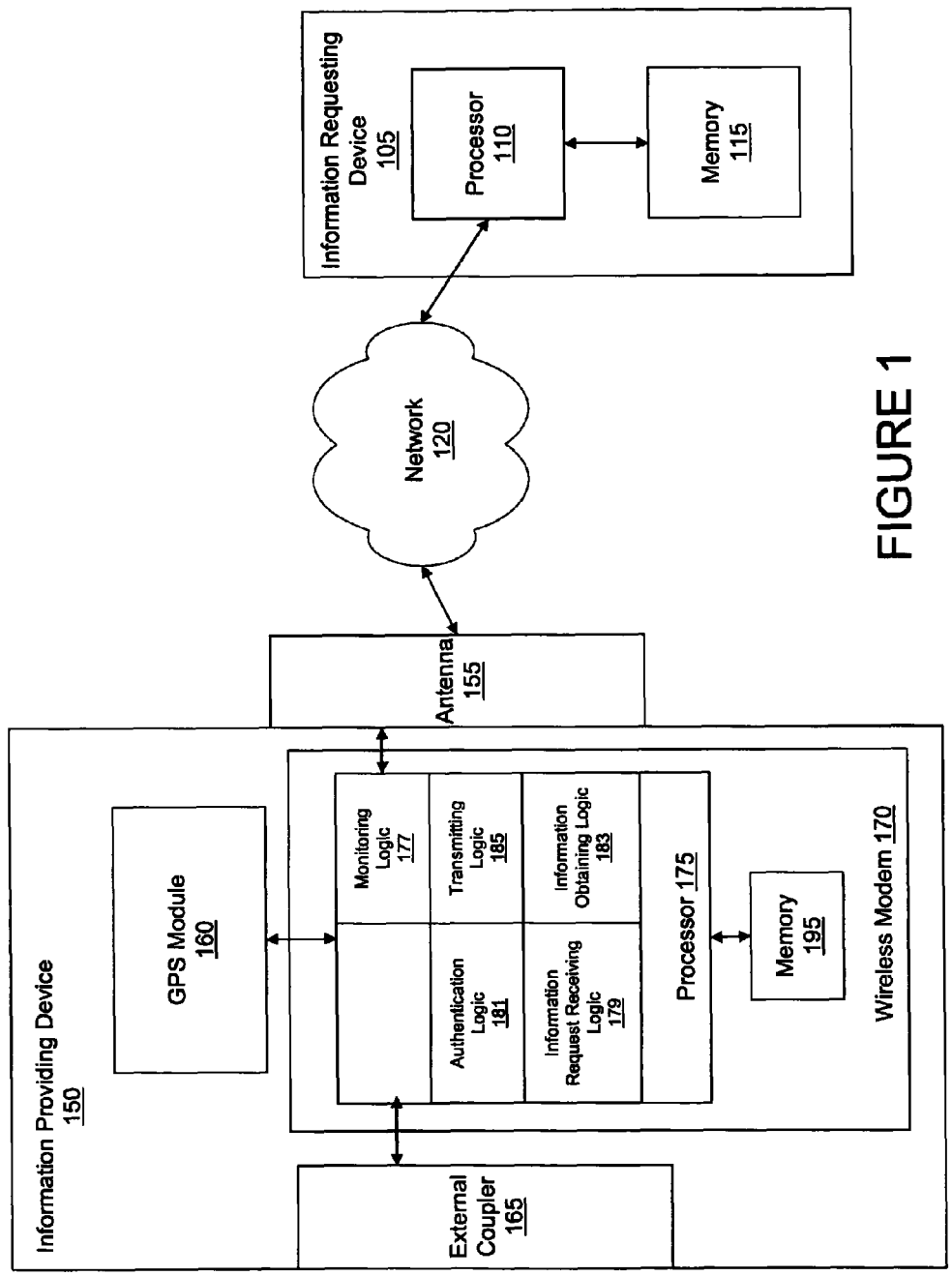
FIG. 1 is a block diagram illustrating an exemplary system in accordance with the present invention.

FIG. 1 is a block diagram illustrating an exemplary system in accordance with the present invention. The system includes an information requesting device 105 which can be selectively coupled via network 120 to an information providing device 150. The information requesting device 105 can be a wireless or wired communication device, such as a telephone, computer, personal digital assistant (PDA), pager and/or the like. If the information requesting device is a wireless communication device, network 120 can be one or more wireless communication networks. If the information requesting device 105 is a wired communication device, network 120 can comprise at least a wireless network and a wired voice and/or data network. The information requesting device 105 includes a processor 110 and memory 115. Processor 110 can be a microprocessor, field programmable gate array (FPGA), application specific integrated circuit (ASIC) and/or the like. Memory 115 can be read-only memory, random access memory, flash memory, a hard drive and/or the like.

The information providing device 150 can be any type of a wireless communication device, such as a wireless telephone, computer, personal digital assistant (PDA), pager and/or the like. The information providing device 150 includes an antenna 155, GPS module 160, external coupler 165 and wireless modem 170. The antenna 155 can be any type of antenna capable of coupling the information providing device 150 to the wireless network 120. The GPS module 160 can be simply a GPS receiver, or can include additional circuitry for processing signals received from a GPS satellite. External coupler 165 can couple the modem 170 to an external device, such as a computer, meter (e.g., an electric or water meter), control device (e.g., a security alarm), switch, relay, and/or the like.

The wireless modem 170 includes a processor 175 and memory 195, which can operate as a server to receive and respond to information requests. The processor 175 includes monitoring logic 177, information request receiving logic 179, authentication logic 181, information obtaining logic 183 and transmitting logic 185, all of which will be described in more detail below. The processor 175 can be a microprocessor, field programmable gate array (FPGA), application specific integrated circuit (ASIC) and/or the like. Memory 195 is coupled to the processor 175 and can store information for the processor and/or include a program for operation of the processor. Memory 195 can be read-only memory, random access memory, flash memory, a hard drive and/or the like.

Figure 2:
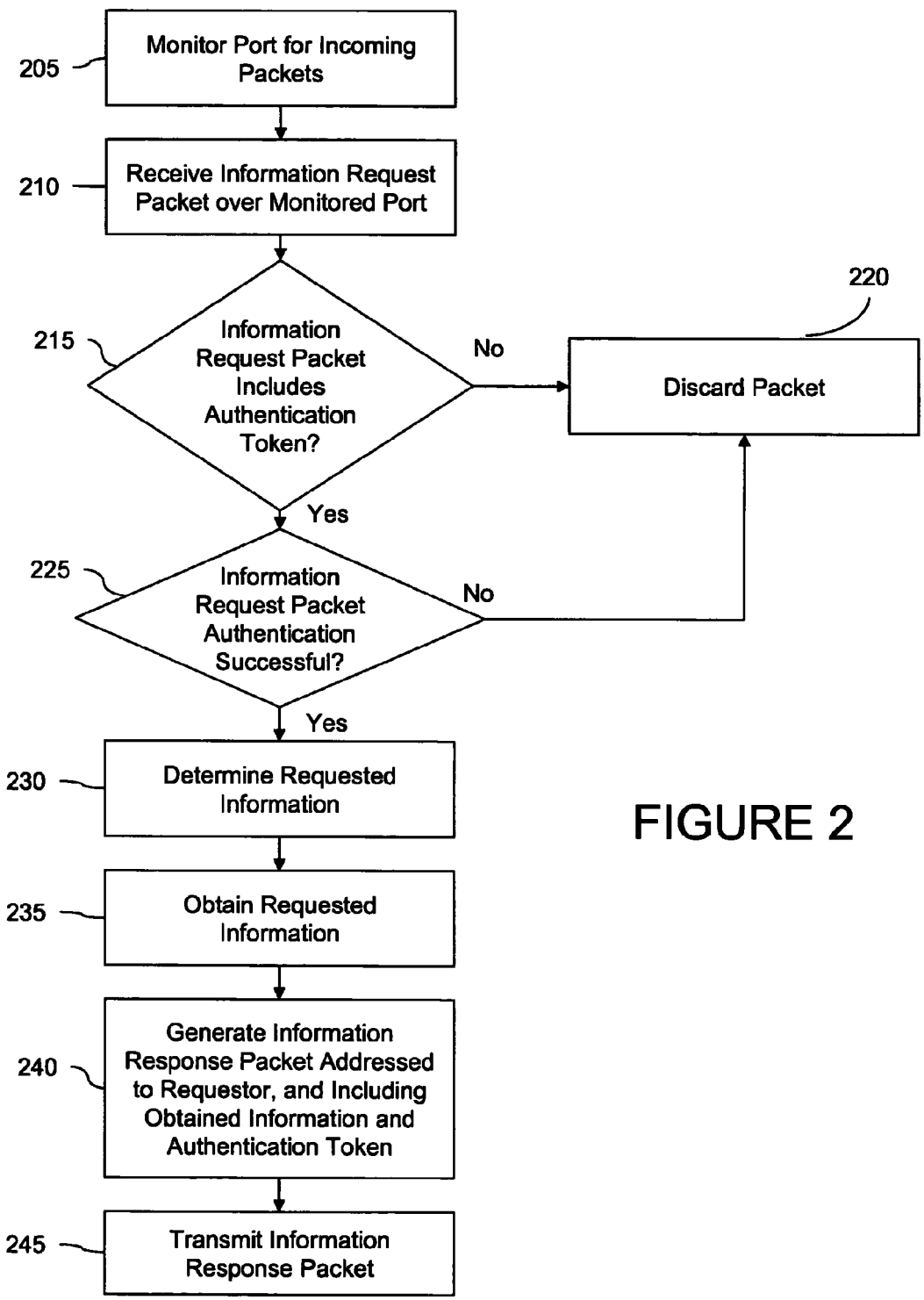
FIG. 2 is a flow diagram illustrating an exemplary method for an information providing device in accordance with the present invention.

FIG. 2 is a flow diagram illustrating an exemplary method for an information providing device in accordance with the present invention. The monitoring logic 177 of the information providing device's processor 175 monitors a particular port for incoming packets (step 205). When the information request receiving logic 179 receives an incoming packet over the particular monitored port (step 210), the authentication logic 181 determines whether the information request packet includes an authentication token (step 215). FIG. 3a illustrates an exemplary information request packet. The information request packet can be a user datagram protocol (UDP) packet or the like. The packet includes a header address of the information providing device 150. The header address can include an Internet Protocol (IP) address, as well as a UDP port number being monitored by the information providing device 150. The body of the packet includes an authentication token and the information request. The information request can be formatted in any manner, including eXtenisble Markup Language (XML), Hyper-Text Markup Language (HTML), plain text, encrypted text and/or the like.

When an information request packet does not include an authentication token ("No" path out of decision step 215), then the information receiving device discards the packet (step 220). When the information request packet includes an authentication token ("Yes" path out of decision step 215), then the authentication logic 181 attempts to authenticate the token. The authentication can be performed using any known authentication technique and can include comparing the authentication token with information stored in the information providing device 150. When the authentication logic 181 is not able to authenticate the token ("No" path out of decision step 225), then the packet is discarded (step 220).

When the authentication logic is able to authenticate the token ("Yes" path out of decision step 225), then the information obtaining logic 183 examines the information request to determine the type of information being requested (step 230). The information being requested can include a current location of the information providing device 150 (obtained from GPS module 160), whether a device (e.g., a computer, meter, control device, switch, relay, and/or the like) is connected to external coupler 165, data from a device (e.g., computer, meter, control device, switch, relay, and/or the like) connected to external coupler 165, whether the wireless modem 170 is transmitting or receiving data, the current signal strength of signals the information providing device 150 is receiving from the network, and/or the like.

The information obtaining logic then obtains the requested information (step 235) and generates an information response packet (step 240). FIG. 3*b* illustrates an exemplary information response packet. The information response packet can be a UDP packet or the like. The information response packet includes a header address, which is the address and port number of the information requestor. The information response packet also includes the same authentication token that was sent in the information request packet, as well as the obtained information. The obtained information can be formatted in the same manner as the information request. The transmitting logic 185 then transmits the information response packet, using antenna 155, to the information requesting device 105 (step 245).

The present invention provides a protocol for allowing a user to send a query packet with authentication to a mobile device and receive information in response. Accordingly, wireless modems can use the protocol to automatically or autonomously report information in response to queries. An additional advantage of the present invention is that a modem using the disclosed protocol to autonomously report data reduces query traffic, which results in a more efficient use of network resources and/or wireless airtime.

Although exemplary embodiments have been described in connection with an information requesting device obtaining information from a single information providing device, the present invention provides a technique in which the information requesting device can easily obtain information from a number of information providing devices. In contrast, conventional wireless communication devices with wireless modems do not include a mechanism or protocol for responding to information requests.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for a wireless modem, comprising the acts of:
    monitoring, by the wireless modem, a port for information request packets;
    receiving, by the wireless modem, an information request packet;
    authenticating, by the wireless modem, the information request packet;
    obtaining, by the wireless modem, information requested by the information request packet; and
    transmitting, by the wireless modem, an information response packet including the obtained information.

2. The method of claim 1, wherein the information request packet includes an authentication token used for authenticating the information request packet.

3. The method of claim 2, wherein the information response packet includes the authentication token.

4. The method of claim 1, wherein the information request and response packets are user datagram protocol (UDP) packets.

5. The method of claim 1, wherein the information in the information request and response packets is formatted according to eXtenisble Markup Language (XML), Hyper-Text Markup Language (HTML), plain text or encrypted text.

6. The method of claim 1, wherein the information requested by the information request packet is geographical location information.

7. The method of claim 1, wherein the information requested by the information request packet is whether a computer is coupled to the wireless modem.

8. The method of claim 1, wherein the information requested by the information request packet is whether the wireless modem is transmitting or receiving data.

9. The method of claim 1, wherein the information requested by the information request packet is a signal strength for signals being received by the wireless modem.

10. A wireless modem, comprising:
    logic for monitoring a port for information request packets;
    logic for receiving an information request packet;
    logic for authenticating the information request packet;
    logic for obtaining information requested by the information request packet; and
    logic for transmitting an information response packet including the obtained information.

11. The wireless modem of claim 10, wherein the information request packet includes an authentication token used for authenticating the information request packet.

12. The wireless modem of claim 11, wherein the information response packet includes the authentication token.

13. The wireless modem of claim 10, wherein the information request and response packets are user datagram protocol (UDP) packets.

14. The wireless modem of claim 10, wherein the information in the information request and response packets is formatted according to eXtenisble Markup Language (XML), Hyper-Text Markup Language (HTML), plain text or encrypted text.

15. The wireless modem of claim 10, wherein the information requested by the information request packet is geographical location information.

16. The wireless modem of claim 10, wherein the information requested by the information request packet is whether a computer is coupled to the wireless modem.

17. The wireless modem of claim 10, wherein the information requested by the information request packet is whether the wireless modem is transmitting or receiving data.

18. The wireless modem of claim 10, wherein the information requested by the information request packet is a signal strength for signals being received by the wireless modem.

19. An information providing device, comprising:
    a wireless communication device; and
    a modem operatively configured together with the wireless communication device, wherein the modem includes
        logic for monitoring a port for information request packets;
        logic for receiving an information request packet;
        logic for authenticating the information request packet;

logic for obtaining information requested by the information request packet; and logic for transmitting an information response packet including the obtained information.

20. The information providing device of claim 19, wherein the information request packet includes an authentication token used for authenticating the information request packet.

21. The information providing device of claim 20, wherein the information response packet includes the authentication token.

22. The information providing device of claim 19, wherein the information request and response packets are user datagram protocol (UDP) packets.

23. The information providing device of claim 19, wherein the information in the information request and response packets is formatted according to eXtenisble Markup Language (XML), Hyper-Text Markup Language (HTML), plain text or encrypted text.

24. The information providing device of claim 19, wherein the information requested by the information request packet is geographical location information.

25. The information providing device of claim 19, wherein the information requested by the information request packet is whether a computer is coupled to the wireless modem.

26. The information providing device of claim 19, wherein the information requested by the information request packet is whether the wireless modem is transmitting or receiving data.

27. The information providing device of claim 19, wherein the information requested by the information request packet is a signal strength for signals being received by the wireless modem.

28. The information providing device of claim 19, wherein the information providing device is a wireless telephone.

29. The information providing device of claim 19, wherein the information providing device is a personal digital assistant.

30. The information providing device of claim 19, wherein the information providing device is a computer.

* * * * *